(12) United States Patent
Furumi

(10) Patent No.: US 10,965,922 B2
(45) Date of Patent: Mar. 30, 2021

(54) DISPLAY DEVICE HAVING FUNCTION FOR ELIMINATING BURN-IN AND METHOD FOR CONTROLLING DISPLAY DEVICE

(71) Applicant: SEIKO EPSON CORPORATION, Tokyo (JP)

(72) Inventor: Yoshiyuki Furumi, Asahi-Mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/446,846

(22) Filed: Jun. 20, 2019

(65) Prior Publication Data

US 2019/0394433 A1 Dec. 26, 2019

(30) Foreign Application Priority Data

Jun. 21, 2018 (JP) .............................. JP2018-118191

(51) Int. Cl.
*H04N 9/31* (2006.01)
*G09G 5/377* (2006.01)

(52) U.S. Cl.
CPC ........... *H04N 9/3179* (2013.01); *G09G 5/377* (2013.01); *H04N 9/312* (2013.01); *G09G 2320/0257* (2013.01); *G09G 2320/046* (2013.01); *G09G 2320/048* (2013.01); *G09G 2320/0606* (2013.01); *G09G 2354/00* (2013.01)

(58) Field of Classification Search
CPC ..... G09G 2320/0257; G09G 2320/048; G09G 3/002; G09G 5/377; G09G 2320/046; G09G 2354/00; G09G 2320/0606; G09G 3/3611; H04N 9/3179; H04N 9/312; H04N 9/3105; H04N 9/3185; H04N 9/3194; H04N 9/3141

See application file for complete search history.

(56) References Cited

U.S. PATENT DOCUMENTS

| | | | |
|---|---|---|---|
| 2007/0046590 A1* | 3/2007 | Umezaki | G09G 3/3225 345/76 |
| 2007/0136566 A1* | 6/2007 | Oshima | G06F 1/3203 713/1 |
| 2007/0159427 A1* | 7/2007 | Koide | G09G 3/3611 345/87 |
| 2008/0278436 A1 | 11/2008 | Sato | |
| 2016/0117973 A1* | 4/2016 | Lee | G09G 3/3275 345/691 |
| 2017/0127028 A1* | 5/2017 | Oike | H04N 9/3147 |
| 2017/0142379 A1* | 5/2017 | Kihara | H04N 9/3179 |
| 2017/0208298 A1* | 7/2017 | Nobori | H04N 9/3155 |
| 2017/0230625 A1* | 8/2017 | Chalapalli | G09G 5/02 |

FOREIGN PATENT DOCUMENTS

| | | |
|---|---|---|
| JP | 2004-325853 A | 11/2004 |
| JP | 2007-187938 A | 7/2007 |

* cited by examiner

*Primary Examiner* — Temesghen Ghebretinsae
*Assistant Examiner* — Ivelisse Martinez Quiles
(74) *Attorney, Agent, or Firm* — Oliff PLC

(57) ABSTRACT

A projector includes: a projection unit having a light modulation device and displaying a projection image via the light modulation device; a time measuring unit measuring a projection time for which the projection unit displays the projection image; a decision unit deciding an elimination execution time for which an elimination function to eliminate burn-in on the light modulation device is executed, based on the projection time; and a processing unit executing the elimination function.

6 Claims, 6 Drawing Sheets

FIG. 4

| RANGE OF PROJECTION TIME | | ELIMINATION EXECUTION TIME |
|---|---|---|
| MINIMUM TIME OF RANGE | MAXIMUM TIME OF RANGE | |
| 0h | 12h | 0h |
| 12h | 24h | 3h |
| 24h | 48h | 6h |
| 48h | 65535h | 12h |

DISPLAY DEVICE HAVING FUNCTION FOR ELIMINATING BURN-IN AND METHOD FOR CONTROLLING DISPLAY DEVICE

The present application is based on, and claims priority from JP Application Serial Number 2018-118191, filed Jun. 21, 2018, the disclosure of which is hereby incorporated by reference herein in its entirety.

BACKGROUND

1. Technical Field

The present disclosure relates to a display device and a method for controlling a display device.

2. Related Art

According to the related art, a technique for eliminating burn-in on a device which displays an image is known. JP-A-2004-325853 is an example of the related art. JP-A-2004-325853 discloses a device which eliminates burn-in on a liquid crystal monitor by displaying an image with a gradation value inverted from that of a previously displayed image on the liquid crystal monitor when there is no change in the latter image for a predetermined period.

It is desirable that the burn-in elimination function is executed for a necessary and sufficient time. Executing the elimination function unnecessarily long or insufficient burn-in elimination due to insufficient execution time is not preferable.

SUMMARY

An advantage of some aspects of the present disclosure is to decide a proper execution time of the function to eliminate display burn-in.

A display device according to an aspect of the present disclosure includes: a display unit including an electro-optical device and displaying an image via the electro-optical device; a time measuring unit measuring a first time period for which the display unit displays the image; a decision unit deciding a second time period for which an elimination function to eliminate burn-in on the electro-optical device is executed, based on the first time period; and a processing unit executing the elimination function.

The display device may also include a storage unit storing correspondence information establishing a correspondence between first time information representing the first time period and second time information representing the second time period. The decision unit may decide the second time period based on the correspondence information.

The display device may also include an operation unit accepting an operation by a user. The display unit may display the image including second time information representing the second time period decided by the decision unit. The processing unit may execute the elimination function for the second time period decided by the decision unit, when the operation unit accepts an operation designating execution of the elimination function.

The display device may also include an operation unit accepting an operation by a user. The display unit may display a selection image including third time information representing the second time period decided by the decision unit and fourth time information representing the second time period that is predetermined. The operation unit may accept a selection operation, which is the operation to select one of the third time information and the fourth time information, in a state where the display unit displays the selection image. The processing unit may execute the elimination function for the second time period represented by the third time information or the fourth time information that is selected, when the operation unit accepts the selection operation.

In the display device, the image may include a first image and a second image superimposed on the first image. The first time period may be a time period for which the second image is displayed.

A method for controlling a display device according to another aspect of the present disclosure is a method for controlling a display device including a display unit which includes an electro-optical device and which displays an image via the electro-optical device. The method includes: measuring a first time period for which the display unit displays the image; deciding a second time period for which an elimination function to eliminate burn-in on the electro-optical device is executed, based on the first time period; and executing the elimination function.

BRIEF DESCRIPTION OF THE DRAWINGS

FIG. 4 shows an example of a correspondence table.

DESCRIPTION OF EXEMPLARY EMBODIMENTS

Figure 1:
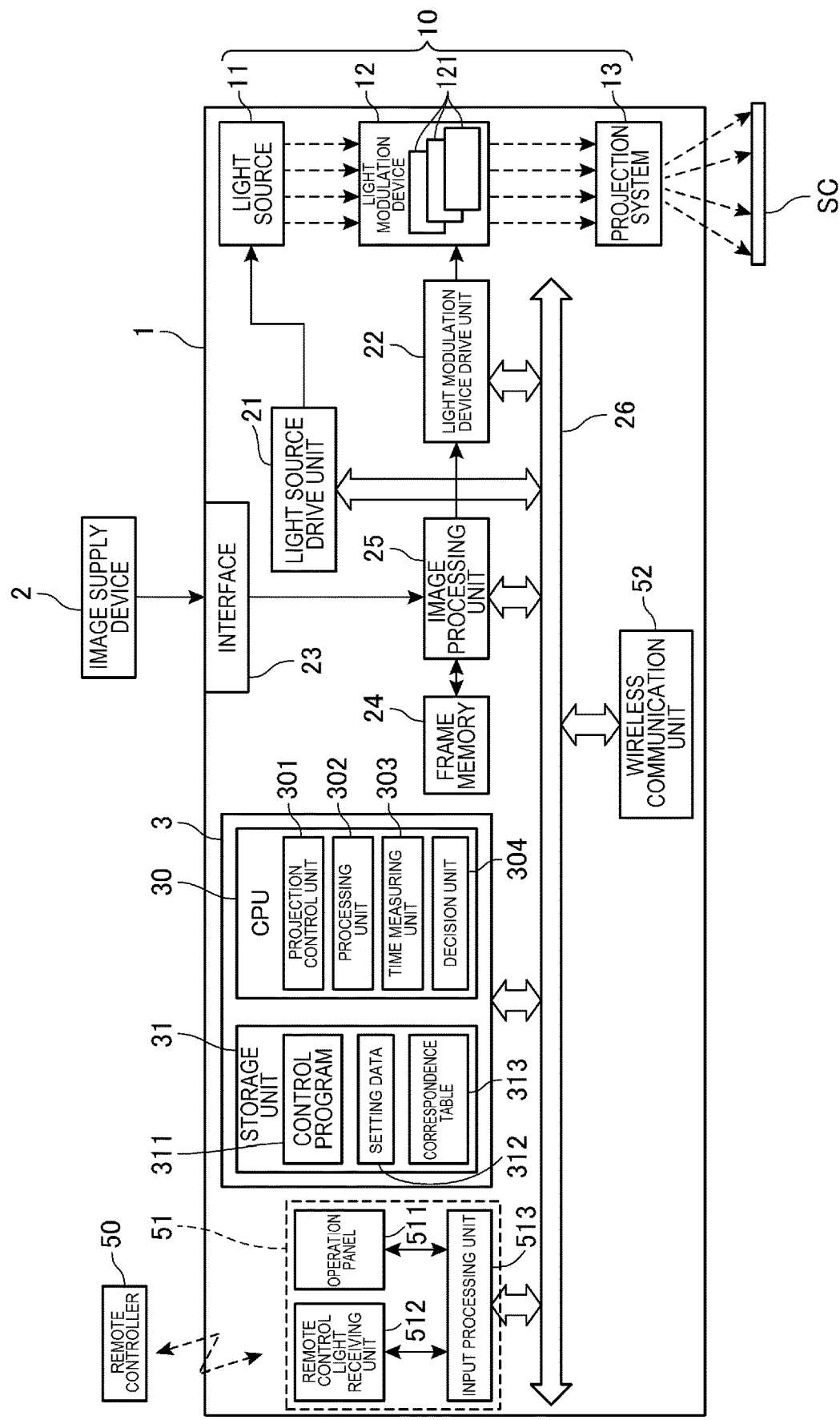
FIG. 1 is a block diagram showing the configuration of a projector.

FIG. 1 is a block diagram showing the configuration of a projector 1 as an embodiment example of the display device according to the present disclosure.

An image supply device 2 as an external device is coupled to the projector 1. The image supply device 2 outputs image data to the projector 1. The projector 1 projects a projection image onto a screen SC as a projection surface, based on the image data inputted from the image supply device 2. The projection of the projection image by the projector 1 is an example of displaying an image by the display device.

The image data inputted from the image supply device 2 is image data conforming to a predetermined standard. The image data may be still image data or dynamic image data and may include audio data.

The image supply device 2 is a so-called image source which outputs image data to the projector 1. The image supply device 2 is not limited to a specific configuration and may be an apparatus that can be coupled to the projector 1 and that can output image data to the projector 1. For example, a disk-type recording medium playback device, a television tuner device, or a personal computer may be used.

The screen SC may be a curtain-like screen. Also, a wall surface of a building, or a plane surface of an installation may be used as the screen SC. The screen SC is not limited to a plane surface and may be a curved surface or a surface with irregularities.

The projector 1 has a control unit 3 which controls each part of the projector 1, and a projection unit 10 which projects a projection image. The projection unit 10 is equivalent to the display unit according to the present disclosure. The control unit 3 includes a CPU 30 and a storage unit 31 or the like. The storage unit 31 is a storage device which stores a control program 311 executed by the CPU 30 and data in a non-volatile manner. The storage unit 31 includes a semiconductor storage element such as a flash ROM. The storage unit 31 may include a RAM forming a work area for the CPU 30.

The CPU 30 executes the control program 311 of the projector 1 stored in the storage unit 31 and thus functions as a projection control unit 301, a processing unit 302, a time measuring unit 303, and a decision unit 304. These functional blocks are implemented by a collaboration of software and hardware as the CPU 30 executes the control program 311.

The storage unit 31 stores setting data 312 and a correspondence table 313 in addition to the control program 311. The correspondence table 313 is equivalent to the correspondence information according to the present disclosure. The setting data 312 includes a set value about an operation of the projector 1. The set value included in the setting data 312 is, for example, the content of processing executed by an image processing unit 25, a parameter used for processing by the image processing unit 25, and the like. The correspondence table 313 will be described later. The storage unit 31 may also store other programs and data.

The projection unit 10 has a light source 11, a light modulation device 12, and a projection system 13. The light modulation device 12 is equivalent to the electro-optical device according to the present disclosure.

The light source 11 includes a lamp such as a halogen lamp, xenon lamp or ultra-high-pressure mercury lamp, or a solid-state light source such as an LED or laser light source. The light source 11 turns on with electric power supplied from a light source drive unit 21 and emits light toward the light modulation device 12.

The light source drive unit 21 supplies a drive current or pulse to the light source 11 under the control of the control unit 3 and thus causes the light source 11 to emit light.

The light modulation device 12 has three liquid crystal panels 121 corresponding to the primary colors of RGB. The light emitted from the light source 11 is separated into color light components of the three colors of RGB by a dichroic mirror, a reflection mirror, a relay lens and the like, and becomes incident on the liquid crystal panels 121 of the corresponding colors. Each liquid crystal panel 121 has a pair of transparent substrates with a liquid crystal enclosed between them. Each liquid crystal panel 121 has a rectangular pixel area where a plurality of pixels are arrayed into a matrix. A drive voltage is applied to the liquid crystal at each pixel by a light modulation device drive unit 22.

To the light modulation device drive unit 22, image data separated into the primary colors of R, G, and B is inputted from the image processing unit 25, described later. The light modulation device drive unit 22 converts the inputted image data of each color into a data signal suitable for the operation of the corresponding liquid crystal panel 121. The light modulation device drive unit 22 applies a drive voltage corresponding to the converted data signal, to the liquid crystal of the liquid crystal panel 121 at each pixel, and thus causes an image to be drawn on a frame basis on each liquid crystal panel 121. The light emitted from the light source 11 is thus modulated into image light by the light modulation device 12.

The projection system 13 has optical elements such as a lens and a mirror or the like. The projection system 13 causes the light modulated by the light modulation device 12 to form an image on the screen SC and thus projects a projection image.

The projector 1 has an interface 23, a frame memory 24, the image processing unit 25, an operation unit 51, and a wireless communication unit 52. These units are coupled to the control unit 3 via a bus 26 in such a way as to be able to communicate data.

The interface 23 is a wired interface for data communication and has a connector and an interface circuit or the like which conform to a predetermined communication standard. In FIG. 1, the connector and the interface circuit are not illustrated. The interface 23 is coupled to the image supply device 2 via a cable and transmits and receives image data and control data or the like to and from an external device, under the control of the control unit 3. As the interface 23, various communication interfaces and image input interfaces can be employed.

The frame memory 24 has a plurality of banks. Each bank has a storage capacity to be able to write one frame of image data. The frame memory 24 includes, for example, an SDRAM. SDRAM is the abbreviation for synchronous dynamic random access memory.

The image processing unit 25 performs image processing such as resolution conversion or resizing, distortion correction, shape correction, digital zoom, or adjustment of the color tone and luminance of the image, onto the image data loaded in the frame memory 24. The image processing unit 25 executes processing designated by the control unit 3 and performs processing using a parameter inputted from the control unit 3 according to need. The image processing unit 25 can also execute a combination of a plurality of types of image processing, of the foregoing types.

The image processing unit 25 reads out the processed image data from the frame memory 24 and outputs the processed image data to the light modulation device drive unit 22.

The operation unit 51 has an operation panel 511, a remote control light receiving unit 512, and an input processing unit 513.

The operation panel 511 is provided on the casing of the projector 1 and has various switches that the user can operate. The input processing unit 513 detects an operation of each switch on the operation panel 511.

The remote control light receiving unit 512 receives an infrared signal transmitted from a remote controller 50. The input processing unit 513 decodes the signal received by the remote control light receiving unit 512, generates operation data, and outputs the operation data to the control unit 3.

The input processing unit 513 is coupled to the operation panel 511 and the remote control light receiving unit 512. When the operation panel 511 or the remote control light receiving unit 512 accepts an operation by the user, the input processing unit 513 generates operation data corresponding to the accepted operation and outputs the operation data to the control unit 3.

The wireless communication unit 52 has an antenna and an RF circuit or the like, not illustrated, and executes wireless data communication with an external device, under the control of the control unit 3. The wireless communication unit 52 executes wireless communication, for example, based on wireless LAN or Bluetooth. Bluetooth is a trademark registered.

The functional blocks of the CPU 30 will now be described.

The projection control unit 301 controls the light source drive unit 21 and the light modulation device drive unit 22, causes the light source drive unit 21 to turn on the light source 11, causes the light modulation device drive unit 22 to drive the light modulation device 12, and thus causes the projection unit 10 to project a projection image. The projection control unit 301 also controls the image processing unit 25 to execute image processing on the image data inputted to the interface 23 and to output the processed image data to the light modulation device drive unit 22.

The processing unit 302 executes an elimination function to eliminate burn-in on each liquid crystal panel 121. Burn-in on the liquid crystal panel 121 is an after-image generated due to uneven distribution of liquid crystal molecules in the liquid crystal or uneven distribution of ionic impurities in the liquid crystal by movement of liquid crystal molecules, and occurs pixel by pixel in the liquid crystal panel 121. Burn-in on the liquid crystal panel 121 tends to occur when the same projection image is projected for a long time. As the projection time becomes longer, the degree of unevenness of distribution increases, resulting in more prominent burn-in. When burn-in occurs on the liquid crystal panel 121, modulation corresponding to the applied drive voltage does not take place at the site of burn-in, and unevenness occurs in the projection image at a site corresponding to the site of burn-in. The processing unit 302 executes the elimination function and thus causes the projection control unit 301 to project a totally black projection image, a totally white projection image, a projection image which changes with the lapse of time like a screen saver, or the like. Thus, the processing unit 302 eliminates the uneven distribution of liquid crystal molecules or ionic impurities and eliminates the burn-in on the liquid crystal panel 121.

In the description below, the burn-in on the liquid crystal panel 121 refers to as burn-in on the light modulation device 12.

The time measuring unit 303 has, for example, a timer and measures a projection time for which the projection unit 10 projects a projection image. The projection time is equivalent to the first time period according to the present disclosure and can also be called display time. The time measuring unit 303 measures the projection time during a period from when the processing unit 302 has executed the elimination function until the next time the processing unit 302 executes the elimination function.

During the time measuring by the time measuring unit 303, the measured projection time is stored in the storage unit 31. The time measuring unit 303 updates the projection time stored in the storage unit 31, every time the projection time count increases. The storage unit 31 stores the projection time in a non-volatile manner. Therefore, even when the power of the projector 1 is turned on/off, the measured projection time is maintained. That is, the projection time stored in the storage unit 31 is a value obtained by accumulating the projection time of the projector 1 and therefore can be referred to as an accumulated value of the projection time. Also, the projection time stored in the storage unit 31 is accumulated until it is reset by the processing by the control unit 3. When the processing unit 302 executes the elimination function, the projection time measured by the time measuring unit 303 is reset. The time measuring unit 303 may temporarily store the projection time in a volatile storage area of the storage unit 31 during the time measuring, and may store the projection time in the storage unit 31 in a non-volatile manner when the projector 1 ends the projection.

The decision unit 304 decides an elimination execution time for which the processing unit 302 executes the elimination function, based on the projection time measured by the time measuring unit 303. The elimination execution time is equivalent to the second time period according to the present disclosure. A method for deciding the elimination execution time will be described later.

Operations of the projector 1 will now be described.

The projector 1 has a normal mode and a burn-in elimination mode, as its operation modes. The normal mode is an operation mode in which an operation other than an operation in the burn-in elimination mode is executed. For example, the normal mode is an operation mode in which a projection image is projected, based on image data inputted from the image supply device 2. The burn-in elimination mode is an operation mode in which an operation to eliminate burn-in on the light modulation device 12 is executed.

Figure 2:
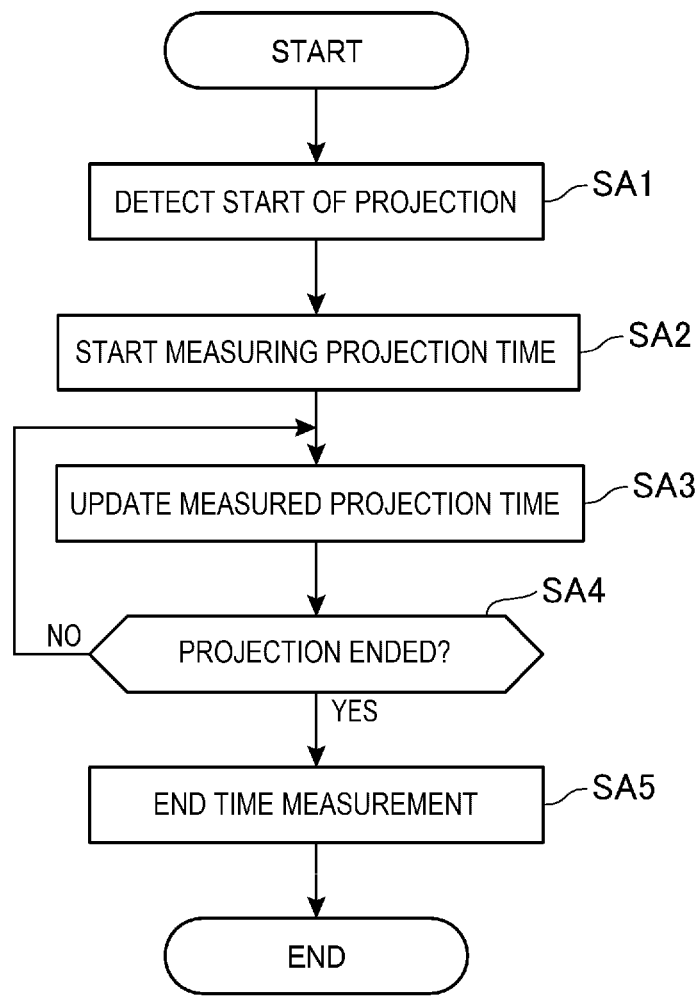
FIG. 2 is a flowchart showing an operation of the projector.

The projector 1 executes the operation shown in FIG. 2 when its operation mode is the normal mode.

FIG. 2 is a flowchart showing the operation of the projector 1 in the normal mode.

The time measuring unit 303 of the control unit 3 detects that the projection unit 10 has started projecting a projection image (step SA1). Then, the time measuring unit 303 starts measuring time (step SA2). In step SA2, the time measuring unit 303 acquires the projection time stored already in the storage unit 31 and starts measuring time in such a way as to accumulate the projection time.

The time measuring unit 303 measures the projection time and updates the projection time stored in the storage unit (step SA3). Here, the control unit 3 determines whether the projection by the projection unit 10 is ended or not (step SA4). When the control unit 3 determines that the projection is not ended (NO in step SA4), the measuring and updating of the projection time continue in step SA3. Meanwhile, when the control unit 3 determines that the projection by the projection unit 10 is ended (YES in step SA4), the measuring of the projection time ends (step SA5).

Figure 3:
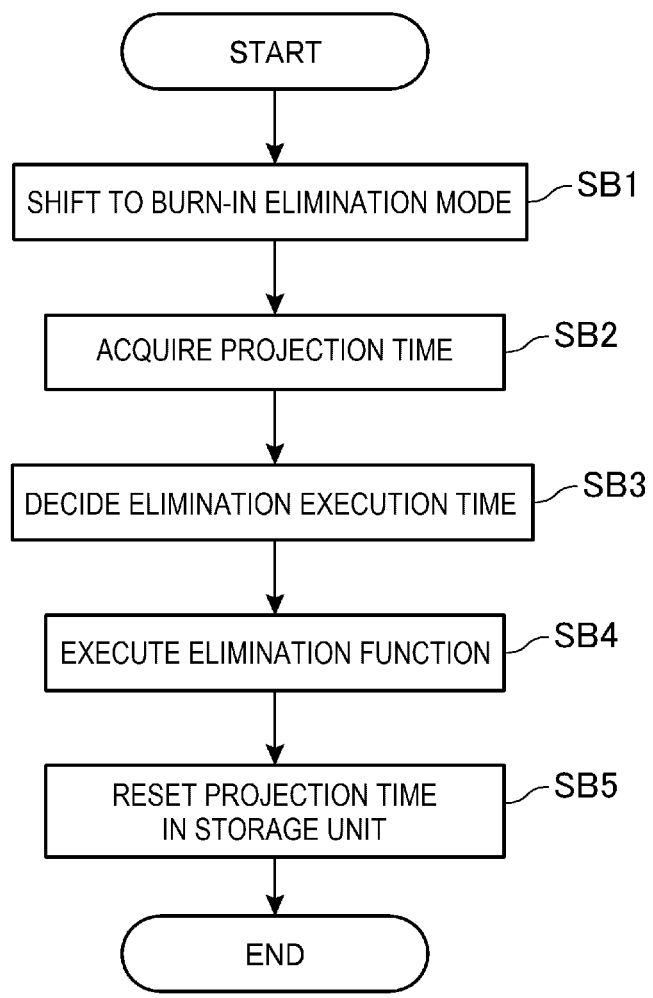
FIG. 3 is a flowchart showing an operation of the projector.

The projector 1 executes the operation shown in FIG. 3 when its operation mode shifts from the normal mode to the burn-in elimination mode.

FIG. 3 is a flowchart showing the operation of the projector 1 in the burn-in elimination mode.

When a trigger for shift is generated, the projector 1 shifts its operation mode from the normal mode to the burn-in elimination mode (step SB1). The trigger for shift may be, for example, that the operation unit 51 has accepted a shift instruction in response to an operation by the user on the remote controller 50 or the operation panel 511, or that a predetermined period has passed after the power is turned on.

When the operation mode of the projector 1 shifts from the normal mode to the burn-in elimination mode, the decision unit 304 of the control unit 3 acquires the projection time measured by the time measuring unit 303, from the storage unit 31 (step SB2).

Next, the decision unit 304 decides the elimination execution time based on the projection time measured by the time measuring unit 303 (step SB3).

The processing in step SB3 will now be described in detail.

In step SB3, the decision unit 304 decides the elimination execution time, referring to the correspondence table 313 stored in the storage unit 31.

FIG. 4 shows an example of the correspondence table 313.

As shown in FIG. 4, a record stored in the correspondence table 313 establishes a correspondence between a field F1 and a field F2.

The field F1 stores information representing a range of projection time. The field F1 establishes a correspondence between a field F11 and a field F12.

The field F11 and the field F12 store projection time information representing the projection time. A range of projection time represented in the field F1 is set record by record. The projection time information is equivalent to the first time information according to the present disclosure. The range of projection time represented in the field F1 is a range from the projection time represented in the field F11 or longer to the projection time represented in the field F12 or shorter. For example, a record R1 stores projection time information representing "0 h" in the field F11 and projection time information representing "12 h" in the field F12. In FIG. 4, "h" is the unit of time. Therefore, the range of projection time represented in the field F1 of the record R1 is a range from 0 h or longer to 12 h or shorter.

The field F2 stores elimination execution time information representing the elimination execution time. The elimination execution time information is equivalent to the second time information according to the present disclosure.

As described above, as the projection time becomes longer, the degree of unevenness of distribution of liquid crystal molecules or ionic impurities becomes higher, resulting in more prominent burn-in on the light modulation device 12. Therefore, the correspondence table 313 stores the elimination time information in such a way that the elimination execution time becomes longer as the projection time becomes longer. Each piece of information stored in the correspondence table 313 is decided based on a prior test, simulation or the like and is stored in the correspondence table 313 in such a way as to have a suitable correspondence to eliminate burn-in on the light modulation device 12.

For example, it is assumed that, in step SB2, the decision unit 304 acquires projection time of "14 h" from the time measuring unit 303. In this case, the decision unit 304 specifies a record R2 which the field F1 representing a range of projection time including the projection time of "14 h" corresponds to, from among the records R1, R2, R3, and R4 stored in the correspondence table 313. The decision unit 304 then acquires the elimination execution time information stored in the field F2 of the specified record R2 and decides on the elimination execution time of "3 h".

In this way, the decision unit 304 decides the elimination execution time based on the projection time measured by the time measuring unit 303. This can restrain the processing unit 302 from executing the elimination function for unnecessarily long or ending the elimination function without achieving sufficient elimination in step SB4. Thus, the decision unit 304 can decide a proper elimination execution time corresponding to the projection time. By deciding the elimination execution time based on the correspondence table 313, the decision unit 304 can univocally decide the elimination execution time without performing complex processing.

In step SB3, the decision unit 304 may calculate and decide the elimination execution time based on the projection time acquired in step SB2, using a predetermined algorithm instead of referring to the correspondence table 313. In this case, the decision unit 304 can decide a proper elimination execution time corresponding to the projection time even when the storage unit 31 does not store the correspondence table 313. Also, the decision unit 304 can more finely decide the elimination execution time corresponding to the projection time than when using the correspondence table 313.

Back to FIG. 3, after the decision unit 304 decides the elimination execution time, the processing unit 302 executes the elimination function for the decided elimination execution time (step SB4).

Next, after the processing unit 302 executes the elimination function, the time measuring unit 303 resets the projection time stored in the storage unit 31 (step SB5). Thus, the projection time measured before shifting to the burn-in elimination mode is cleared. The time measuring unit 303 does not accumulate the projection time over a period ranging from before and after the execution of the elimination function. When the time measuring unit 303 starts measuring the projection time after step SB5, the projection time is measured from "0". Therefore, the decision unit 304 does not decide on an unnecessarily long elimination execution time and can decide a proper elimination execution time corresponding to the projection time between executions of the elimination function.

Several modification examples of the embodiment will now be described.

First Modification Example

In the foregoing embodiment, it is described that after the decision unit 304 decides the elimination execution time, the processing unit 302 executes the elimination function for the decided elimination execution time. In a first modification example, when the operation unit 51 accepts an operation designating the execution of the elimination function, the processing unit 302 executes the elimination function for the elimination execution time decided by the decision unit 304.

Figure 5:
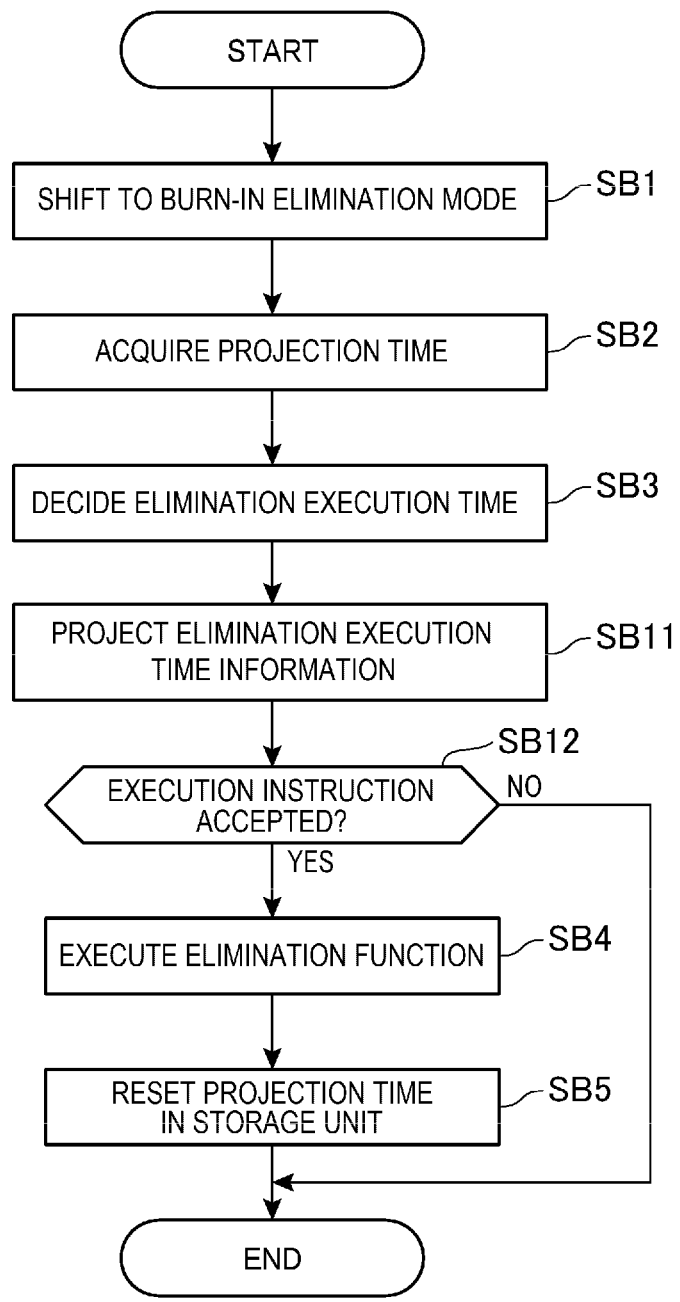
FIG. 5 is a flowchart showing an operation of a projector according to a first modification example.

FIG. 5 is a flowchart showing the operation of the projector 1 in the first modification example. In the flowchart of FIG. 5, the same processes as in the embodiment are denoted by the same step numbers and are not described further in detail.

After the decision unit 304 decides the elimination execution time in step SB3, the projection control unit 301 causes the projection unit 10 to project a projection image including the elimination execution time information representing the elimination execution time decided by the decision unit 304 (step B11). This enables the user to recognize the time required to eliminate burn-in on the light modulation device 12.

The processing unit 302 determines whether the operation unit 51 has accepted an operation designating the execution of the elimination function or not (step SB12). When the processing unit 302 determines that the operation unit 51 has accepted an operation designating the execution of the elimination function (YES in step SB12), the processing unit 302 shifts to step SB4 and executes the elimination function for the elimination execution time decided by the decision unit 304 (step SB4).

Meanwhile, when the processing unit 302 determines that the operation unit 51 has not accepted an operation designating the execution of the elimination function (NO in step SB12), the processing unit 302 ends this processing without executing steps SB4 and SB5. In step SB12, the processing unit 302 may wait for the acceptance of an operation for a preset standby time and may determine as negative when an operation designating the execution of the elimination function is not accepted within the standby time.

In the first modification example, the elimination function is not started at a timing not intended by the user. Thus, convenience for the user is improved. For example, when the elimination execution time displayed in step SB11 is longer than the intended time, the user can continue the projection by the projector 1 or turn off the power of the projector 1 without executing the elimination function.

The processing unit 302 does not execute the elimination function when a predetermined period has passed after the projection unit 10 projects a projection image including the elimination execution time information representing the elimination execution time decided by the decision unit 304 or when the operation unit 51 has accepted an operation designating that the elimination function is not to be executed. In this case, the projector 1 shifts its operation mode from the burn-in elimination mode to the normal mode. The time measuring unit 303 does not reset the measured projection time. Thus, even when the operation mode shifts to the burn-in elimination mode at a timing not intended by the user, the user can cause the projector 1 to shift its operation mode to the normal mode without executing the elimination function. Since the time measuring unit 303 does not reset the projection time, the decision unit 304 can decide a proper elimination execution time when the next elimination function is executed.

Second Modification Example

In the first modification example, the decision unit 304 decides the elimination execution time and the projection unit 10 then projects a projection image including the elimination execution time information representing the elimination execution time decided by the decision unit 304.

In a second modification example, the projection unit 10 projects a projection image including the elimination execution time information representing the elimination execution time decided by the decision unit 304 and elimination execution time information representing a predetermined elimination execution time.

Figure 6:
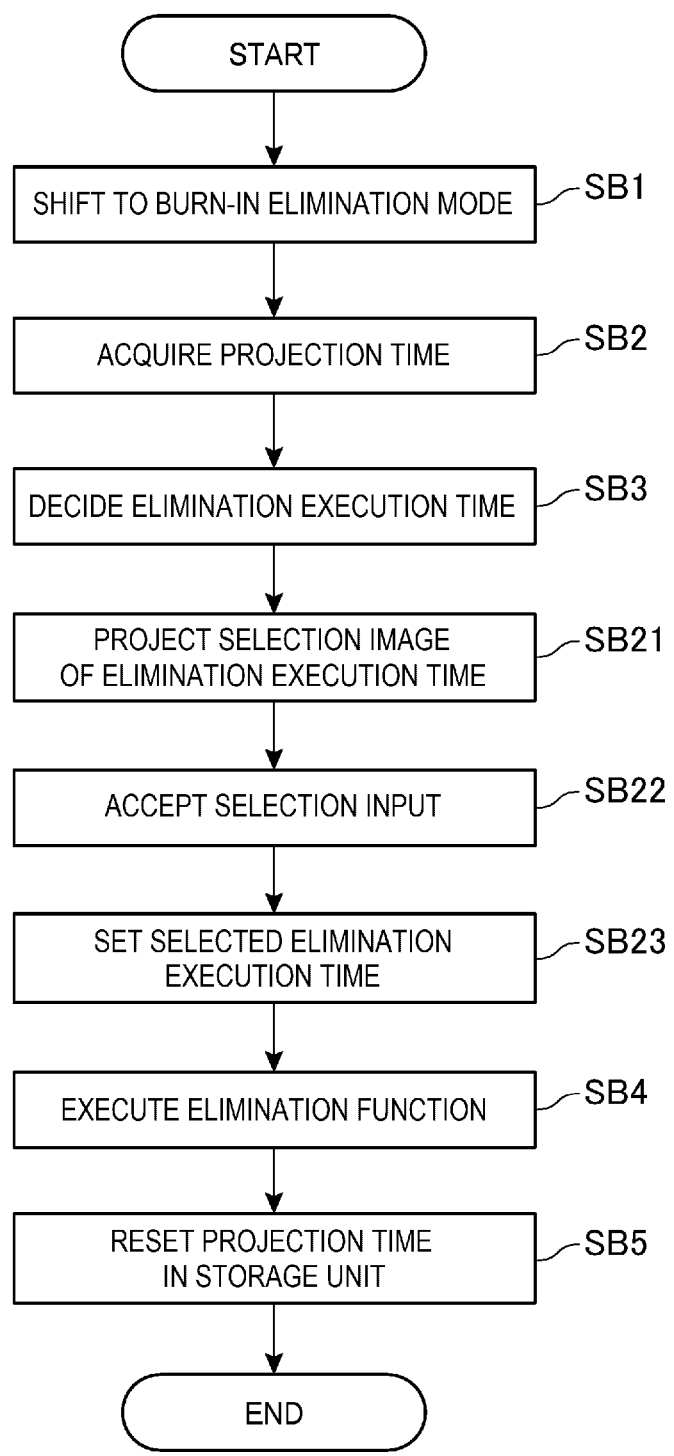
FIG. 6 is a flowchart showing an operation of a projector according to a second modification example.

FIG. 6 is a flowchart showing the operation of the projector 1 in the second modification example. In the flowchart of FIG. 6, the same processes as in the embodiment are denoted by the same step numbers and are not described further in detail.

After the decision unit 304 decides the elimination execution time in step SB3, the projection control unit 301 causes the projection unit 10 to project a selection image including the elimination execution time information representing the elimination execution time decided by the decision unit 304 and elimination execution time information representing a predetermined elimination execution time (step SB21). In the projection image projected in step SB21, the elimination execution time decided in step SB3 and a preset time are arranged as selectable candidates. The elimination execution time information representing the elimination execution time decided by the decision unit 304 is equivalent to the third time information according to the present disclosure. The elimination execution time information representing a predetermined elimination execution time is equivalent to the fourth time information according to the present disclosure.

For example, when the decision unit 304 decides that the elimination execution time is "3 h" based on the correspondence table 313 in step SB3, a projection image in which the decided "3 h" and the other elimination execution times "0 h", "6 h", and "12 h" stored in the field F2 are arranged is projected in step SB21. In this example, the preset elimination execution time is one of the elimination execution times set in the correspondence table 313.

In the state where the projection image including the elimination execution time information is displayed by the projection unit 10 in step SB21, the operation unit 51 accepts an operation to select one piece of elimination execution time information from among the plurality of pieces of elimination execution time information arranged in the projection image (step SB22). The processing unit 302 sets the elimination execution time represented by the elimination execution time information selected by the selection operation accepted by the operation unit 51, as the actual execution time to be used (step SB23). The processing unit 302 shifts to step SB4 and execute the elimination function for the elimination execution time that is set in step SB23 (step SB4). Thus, the user can select an elimination execution time other than the automatically decided elimination execution time and can cause the projector 1 to execute the elimination function accordingly.

Third Modification Example

In the foregoing embodiment, the first modification example, and the second modification example, the case where the time measuring unit 303 measures the projection time for which the projection unit 10 projects a projection image is described. In a third modification example, the time measuring unit 303 measures the projection time for which a filter image is projected. The filter image is an image superimposed on an image (hereinafter referred to as an "original image") based on image data inputted from the input supply device 2. The projector 1 projects the filter image as superimposed on the original image and thus can provide the original image with a predetermined visual effect. The original image is equivalent to the first image according to the present disclosure. The filter image is equivalent to the second image according to the present disclosure.

The projector 1 may project various original images with the same visual effect. In this case, the projector 1 superimposes the same filter image on various original images and therefore projects the same filter image for a longer time than the original images. Therefore, in the liquid crystal panel 121, the same drive voltage is applied to a pixel corresponding to the filter image, for a long period. Accordingly, when the filter image is included, burn-in tends to occur in an area where the filter image is drawn in the liquid crystal panel 121. Thus, the time measuring unit 303 measures the projection time for which the filter image is projected. This allows the decision unit 304 to decide a proper elimination execution time corresponding to the projection time of the filter image. Thus, even when burn-in occurs on the liquid crystal panel 121 due to the projection of the filter image, the processing unit 302 can eliminate the burn-in in a proper time.

As described above, the projector 1 includes: the projection unit 10 having the light modulation device 12 and projecting a projection image via the light modulation device 12; the time measuring unit 303 measuring a projection time for which the projection unit 10 projects the projection image; the decision unit 304 deciding an elimination execution time to eliminate burn-in on the light modulation device 12, based on the projection time; and the processing unit 302 executing the elimination function.

In the projector 1, to which the display device and the method for controlling the display device according to the present disclosure are applied, the decision unit 304 decides the elimination execution time based on the projection time measured by the time measuring unit 303 and therefore can decide a proper elimination execution time according to the projection time.

The projector 1 also has the storage unit 31 storing the correspondence table 313 establishing a correspondence between the projection time information representing the projection time and the elimination execution time information representing the elimination execution time. The decision unit 304 decides the elimination execution time, based on the correspondence table 313.

In this configuration, the decision unit 304 decides the elimination execution time based on the correspondence table 313 and thus can univocally decide the elimination execution time without performing complex processing.

The projector 1 also has the operation unit 51 accepting an operation by the user. The projection unit 10 projects the projection image including the elimination execution time information representing the elimination execution time decided by the control unit 3. The processing unit 302 executes the elimination function for the elimination execution time decided by the decision unit 304, when the operation unit 51 accepts an operation designating the execution of the elimination function.

In this configuration, the user can recognize the time required to eliminate burn-in. Also, since the elimination function does not start at a timing not intended by the user, convenience for the user is improved in the elimination of burn-in on the light modulation device 12.

The projection unit 10 also projects a selection image including the elimination execution time information representing the elimination execution time decided by the decision unit 304 and the elimination execution time information representing a predetermined elimination execution time. The operation unit 51 accepts a selection operation to select one piece of elimination execution time information from the selection image projected by the projection unit 10. When the operation unit 51 accepts the selection operation, the processing unit 302 executes the elimination function for the elimination execution time represented by the selected elimination execution time information.

This configuration enables the user to select an elimination execution time other than the automatically decided elimination execution time and to cause the projector 1 to execute the elimination function accordingly.

The projection image includes an original image and a filter image superimposed on the original image. The projection time measured by the time measuring unit 303 is the time for which the filter image is projected.

In this configuration, the decision unit 304 can decide a proper elimination execution time corresponding to the projection time of the filter image. Therefore, even when burn-in occurs on the liquid crystal panel 121 due to the projection of the filter image, the processing unit 302 can eliminate the burn-in in a proper time.

The foregoing embodiment and modifications are preferred forms of embodiment. However, the present disclosure is not limited to these. Various other modifications can be made without departing from the scope and spirit of the present disclosure.

For example, when the method for controlling the projector 1 is implemented using a computer provided in the projector 1 or an external device coupled to the projector 1, the present disclosure can be configured in the form of a program executed by the computer in order to implement the method, a recording medium on which this program is recorded in a computer-readable manner, or a transmission medium transmitting this program. The method for controlling the projector 1 is equivalent to the method for controlling a display device according to the present disclosure.

The processing stages in the flowcharts of FIGS. 2 and 3 are separated according to the main processing content in order to facilitate understanding of the processing by the control unit 3 of the projector 1. The way the processing stages are separated and the names of the processing stages in the flowcharts of FIGS. 2 and 3 do not limit the present disclosure. The processing by the control unit 3 can be separated into more processing stages according to the processing content and can also be separated in such a way that one processing stage includes more processes. The order of processing in the flowcharts is not limited to the illustrated example.

Each functional unit of the projector 1 shown in FIG. represents a functional configuration implemented by a collaboration of hardware and software and is not particularly limited to a specific form of installation. Therefore, pieces of hardware corresponding to the individual functional units need not necessarily be installed. A single processor can implement functions of a plurality of functional units by executing a program. Also, a part of the functions implemented by software in the embodiment may be implemented by hardware, and a part of the functions implemented by hardware may be implemented by software.

The display device according to the present disclosure is not limited to a projector which projects an image onto the screen SC. For example, the display device includes a self-light-emitting display device such as a liquid crystal display device which displays an image on a liquid crystal display panel or a display device which displays an image on an organic EL panel. The display device according to the present disclosure also includes various other display devices.

What is claimed is:

1. A display device comprising:
a projector that includes an electro-optical device and is configured to display an image via the electro-optical device;
a processor configured to function as:
a time measuring unit that measures a first time period for which the projector displays the image;
a decision unit that decides a second time period for which an elimination function to eliminate burn-in on the electro-optical device is executed, based on the first time period; and
a processing unit that executes the elimination function; and
a storage that stores correspondence information establishing a correspondence between first time information representing the first time period and second time information representing the second time period, wherein
the decision unit decides the second time period based on the correspondence information.

2. The display device according to claim 1, further comprising
a switch that accepts an operation by a user, wherein
the projector displays the image including second time information representing the second time period decided by the decision unit, and
the processing unit executes the elimination function for the second time period decided by the decision unit, when the switch accepts an operation designating execution of the elimination function.

3. The display device according to claim 1, further comprising
a switch that accepts an operation by a user, wherein the projector displays a selection image including third time information representing the second time period decided by the decision unit and fourth time information representing the second time period that is predetermined, the switch accepts a selection operation, which is the operation to select one of the third time information and the fourth time information, in a state where the projector displays the selection image, and the processing unit executes the elimination function for the second time period represented by the third time information or the fourth time information that is selected, when the switch accepts the selection operation.

4. The display device according to claim 1, wherein
the image includes a first image and a second image superimposed on the first image, and
the first time period is a time period for which the second image is displayed.

5. A method for controlling a display device including a projector and a storage, the projector having an electro-optical device and being configured to display an image via the electro-optical device, the method comprising:

measuring a first time period for which the projector displays the image;

deciding a second time period for which an elimination function to eliminate burn-in on the electro-optical device is executed, based on the first time period and a correspondence information, the correspondence information being stored in the storage and being a correspondence between first time information representing the first time period and second time representing the second time period; and executing the elimination function.

6. A display device comprising:

a projector that includes an electro-optical device and is configured to display an image via the electro-optical device; and a processor configured to function as:

a time measuring unit that measures a first time period for which the projector displays the image;

a decision unit that decides a second time period for which an elimination function to eliminate burn-in on the electro-optical device is executed, based on the first time period; and a processing unit that executes the elimination function, wherein the image includes a first image and a second image superimposed on the first image, and the first time period is a time period for which the second image is displayed.

* * * * *